Jan. 12, 1926.  
A. D. JOUSSET ET AL  
TRAILER TRUCK  
Filed Jan. 3, 1924

1,569,498

2 Sheets-Sheet 1

Inventor  
Albert D. Jousset  
Harry T. Malone  
By  
Attorney

Jan. 12, 1926.
A. D. JOUSSET ET AL
1,569,498
TRAILER TRUCK
Filed Jan. 3, 1924        2 Sheets-Sheet 2
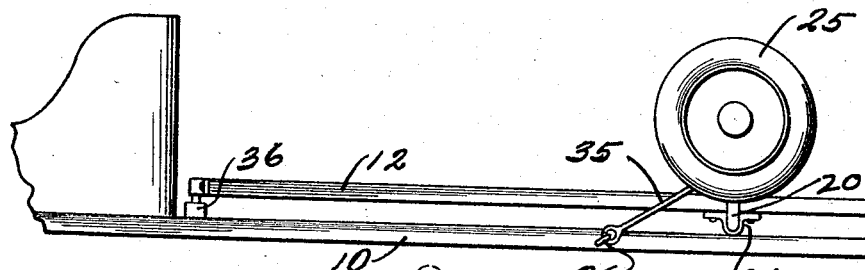
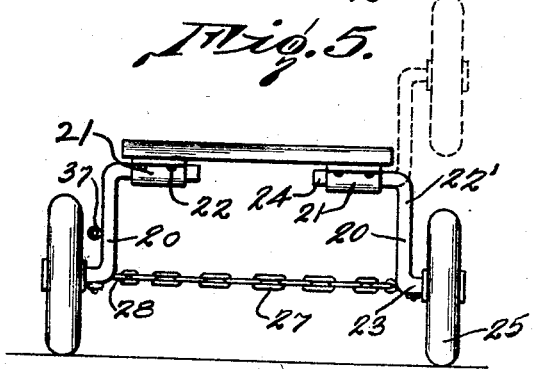
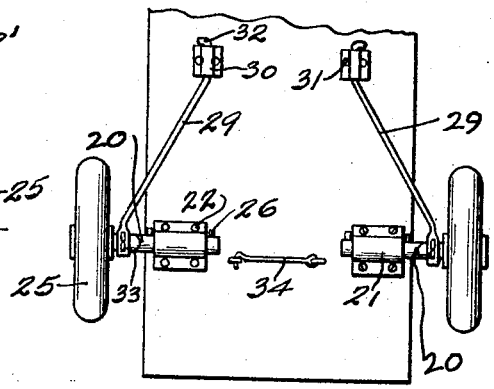
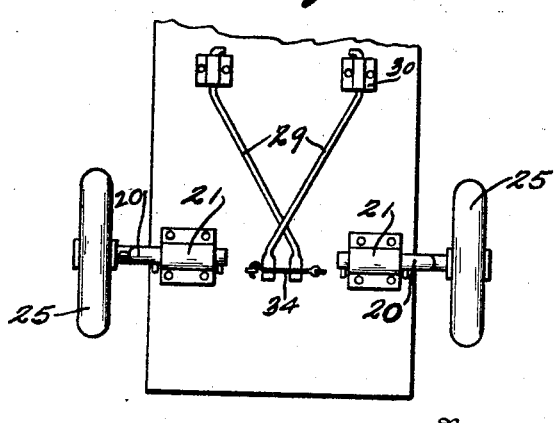
Inventor
Albert D. Jousset
Harry D. Malone
By              Attorney Patented Jan. 12, 1926.

1,569,498

UNITED STATES PATENT OFFICE.

ALBERT D. JOUSSET AND HARRY D. MALONE, OF PATERSON, NEW JERSEY.

TRAILER TRUCK.

Application filed January 3, 1924. Serial No. 684,122.

*To all whom it may concern:*

Be it known that we, ALBERT D. JOUSSET and HARRY D. MALONE, citizens of the United States, residing at Paterson, in the county of Passaic and State of New Jersey, have invented certain new and useful Improvements in a Trailer Truck, of which the following is a specification.

This invention relates to improvements in trailer trucks and particularly that type of trailer which has a pair of wheels secured to the rear end thereof, the front end being secured to the rear of a motor truck or the like.

An important object of the invention is to provide a trailer which may be positioned on the truck when not in use without interfering with the loading or handling thereof.

A further object of the invention is to provide a trailer of this character whereby the wheels may be swung upwardly and out of the way when the trailer is carried upon the truck.

A further object of the ivention is to provide a trailer of this character which is comparatively simple yet durable of construction and efficient for the purpose intended.

Other objects and advantages of this invention will be apparent during the course of the following description.

Figure 1:
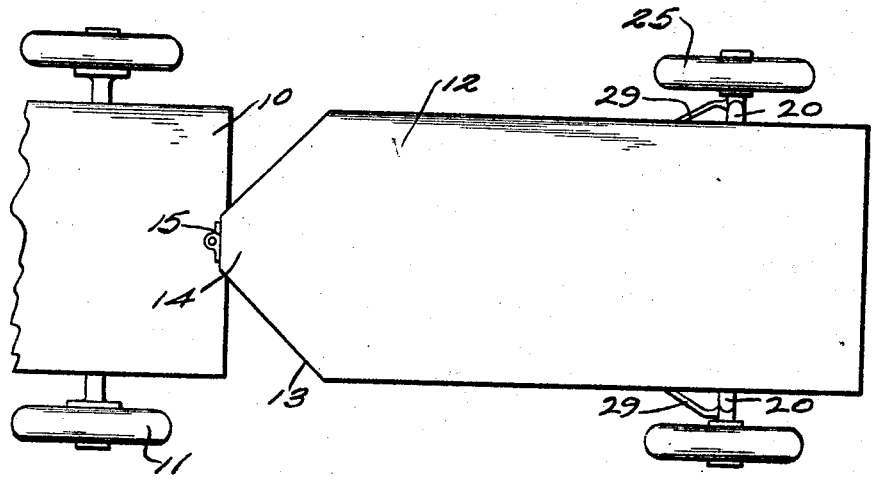
Figure 2:
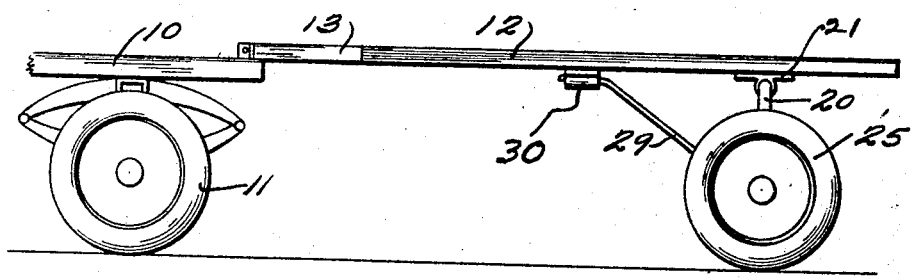
Figure 3:
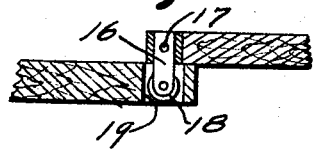

In the accompanying drawings forming a part of this specification and in which like numerals are employed to designate like parts throughout the same:

Figure 1 is a top plan view of our device secured to the rear end of a motor truck, Figure 2 is a side elevation of the same, Figure 3 is an enlarged detail of the rolling and securing means, Figure 4 is a side elevation of my device positioned on the truck body, Figure 5 is a rear elevation of the device, Figure 6 is a bottom plan view of the trailer showing the wheels thereon, and Figure 7 is a similar view showing the wheels in the raised position.

In the drawings, wherein for the purpose of illustration is shown the preferred embodiment of our invention, the numeral 10 designates the body of a motor truck and 11 the rear drive wheels thereof. The numeral 12 designates the body of the trailer truck, the bodies of the trailer truck and motor vehicle being herein illustrated as the commonly used open vehicles, although it is not intended to restrict the device to this application, as sides may be applied to the bodies and even a top without materially restricting the application of this invention. The front end of the trailer body 12 is cut away at the corners as indicated at 13, the projecting central portion 14 being adapted to extend slightly over the truck body 10 to form a rest therefor. It is considered desirable to form the front end of the body in this manner to enable the vehicle to be turned on a very small radius.

Secured to the forward portion of the trailer body 12 is a bracket 15 which carries a roller guide 16 which is secured to the bracket by a pin 17 which penetrates the roller guide and bracket. A roller 18 is rotatably mounted on the bottom portion of the roller guide and is adapted to roll over the motor truck body when it is desired to mount the trailer truck upon the power vehicle. When the trailer truck is in operation, the roller guide 16 and roller 18 are placed in a suitable aperture 19 formed in the rear portion of the motor truck.

The rear end of the trailer truck 12 has a pair of stub shafts 20 rotatably mounted to the underside of the body by means of brackets 21 which are secured to the body by means of screws 22 or the like. The stub shafts are formed of a vertical bar 22' and oppositely formed axle members 23 and 24, the lower axles having the ground wheels 25 mounted thereon. The upper axle members 24 are fitted within the brackets 21 and are prevented from displacement therefrom by means of pins 26, said pins being so positioned as to permit the stub axles to be revolved about 180 degrees. In order to prevent spreading of the wheels when an unusually heavy load is placed upon the body, a chain 27 is provided to connect with the lower portions of the vertical bars 22', the chain being connected to the bars 22' by eye bolts 28 or the like. In order to brace the stub shafts 20 when the trailer is secured to the rear of the motor truck, a pair of brace rods 29 are attached to the underside of the body by the brackets 30 which are secured to the body by means of screws 31, or the like. The forward ends of the brace rods 29 are turned to form the stop levers 32 which prevent the displacement of the brace rods from the brackets 30. The other extremities of the brace rods 29 are flattened and have an aperture formed therein for engagement with a cotter pin 33 which is inserted through a like aperture in the lower axle and secures the brace and axle.

When the trailer is positioned on the motor truck body, the brace rod 29 is disconnected from the stub axle and retained against the bottom of the trailer by a hook 34, which is secured to the bottom of the body for this purpose. In order to retain the wheels in the raised position when the trailer is positioned on the motor vehicle, we have provided a hooked rod 35 which is fastened to the sides of the motor vehicle by an eye bolt 36 and engages a similar eye bolt 37 which is fastened to the vertical rod of the stub shaft. To prevent displacement of the trailer body when mounted on the motor truck, we have also provided a block 38 which is secured to the bottom of the motor vehicle and has a recess formed therein to engage the roller which is secured to the front portion of the trailer.

In use, when it is desired to utilize the tractor truck as a conveyance, the roller shaft 16 is positioned within the aperture 19 formed in the rear portion of the motor vehicle and the brace rods 29 secured in position. It is thus seen that the device is capable of carrying comparatively heavy loads and greatly adds to the capacity of the motor vehicle.

When the motor truck is empty or only carrying a comparatively small load, the trailer truck is merely pushed upon the floor of the motor vehicle and the wheels inverted, practically forming a second floor bottom for the motor truck without notable loss of space or inconvenience in conveying merchandise.

It is to be understood that the form of our invention herewith shown and described is to be taken as the preferred example of the same, and that various changes in the shape, size, and arrangement of parts may be resorted to, without departing from the spirit of the invention, or the scope of the subjoined claims.

Having thus described our invention, we claim:

1. A trailer vehicle of the character described comprising a body having its front end tapered, a pair of stub shafts composed of a vertical rod and a pair of oppositely extending horizontal shafts, a chain secured to the lower portions of the stub shafts for strengthening same, a pair of brace rods adapted to brace the stub axles, means for fastening the brace rods to the trailer body, means for fastening the brace rods to the lower portions of the stub axles, a roller secured to the front end of the body, and means for retaining the wheels in an inverted position.

2. In combination with a motor truck having a recessed block secured to the forward portion of the bottom and an aperture formed in the rear portion thereof, of a trailer having a body, the front portion of said body being tapered; a roller guide secured to the front end of the trailer body, a roller rotatably mounted in the lower portion of the roller guide, and a bracket for securing the roller guide to the trailer body; a pair of stub shafts composed of vertical rods, opposed shafts formed on the extremities of the vertical rods; a pair of brackets secured to the underside of the trailer body and having a bore drilled therein adapted to receive the upper axle, means for securing the axle bracket to the trailer body, a plurality of pins positioned within the axle to prevent displacement thereof, and a chain connecting the lower axles to prevent the spread thereof; a pair of brace rods, said rods being bent at oblique angles, stub levers formed on the front end of the brace rods, means for securing the brace rods and axles, a pair of brackets for rotatably mounting the brace rods and axles, a pair of brackets for rotatably mounting the brace rods to the underside of the body; a hook for retaining the brace rods against the bottom of the body when not in use, and means for retaining the wheels in an inverted position.

3. In combination with a motor vehicle having a recessed block secured on the front portion of the bottom and having a recess formed in the rear end of the bottom, of a trailer comprising a body, the front end of said body being tapered, a roller guide, means for fastening the roller guide to the front of the trailer body, a roller rotatably mounted within the roller guide, a stub shaft comprising a vertical rod and horizontal opposed shaft rods, means for rotatably mounting the stub shaft to the body, means for preventing spread of the axles when in use, a pair of brace rods, means for securing the brace rods to the axles, means for attaching the brace rods to the body, a hook member for retaining the brace rods against the body when not in use, and a hook for retaining the wheels in an inverted position.

4. A trailer vehicle of the character described comprising a body, a pair of crank shaped stub shafts, road wheels mounted upon one end of said stub shafts, means for rotatably mounting the other end of said stub shafts to the body, said crank shaped stub shafts permitting the wheels to be raised with relation to the body, a chain joining the lower portions of said crank shaped stub shafts for preventing spreading thereof, a pair of brace rods for bracing said stub shafts, means for securing the brace rods to the trailer body when said brace rods are not in use, and means for securing the trailer to a motor vehicle or the like.

In testimony whereof, we have affixed our signatures.

ALBERT D. JOUSSET.
HARRY D. MALONE.